Patented July 17, 1951

2,561,284

UNITED STATES PATENT OFFICE 2,561,284

PROCESS FOR OBTAINING A 5-PHENYL-5-LOWER ALKYL HYDANTOIN

Loren M. Long, Detroit, Mich., assignor to Parke, Davis & Company, Detroit, Mich., a corporation of Michigan No Drawing. Application August 23, 1947, Serial No. 770,323

8 Claims. (Cl. 260—309.5)

The invention relates to a new process for the preparation of 5,5-disubstituted hydantoins and to new optically active and therapeutically useful hydantoin compounds obtainable by said process.

The new process of the invention is an improved method for reacting an α-amino-α-phenyl-α-lower alkyl acetic acid with urea for the production of the corresponding 5-phenyl-5-lower alkyl substituted hydantoin.

Heretofore an aqueous solution of urea has been refluxed for a long period of hours with an α-amino-α-phenyl-α-lower alkyl substituted acetic acid in order to obtain the corresponding 5-phenyl-5-lower alkyl substituted hydantoin. This process is not only time consuming but gives very poor yields of the crude hydantoin.

The process of the present invention is to fuse a non-aqueous, or a substantially anhydrous, mixture of urea and the α-amino-α-phenyl-α-lower alkyl substituted acetic acid and thereafter hold the liquefied reactants at a reaction temperature for a relatively short period until most, or all, of the substituted acetic acid is converted to the corresponding hydantoin. The reaction mixture is then acidified and cooled and the insoluble hydantoin filtered off from any unreacted urea which remains in solution. The washed and dried hydantoin product is a pure chemical substance which can be used as such or can be converted to its salts, such as alkali metal and ammonium salts, by reaction with a basic alkaline compound, such as sodium or calcium or magnesium hydroxide, or with sodium carbonate or ammonium hydroxide.

The process of this invention is of especial utility when preparing optically active 5-phenyl-5-lower alkyl substituted hydantoins. I have found that the optically active forms of the intermediate α-amino-α-phenyl-α-lower alkyl acetic acids undergo the reaction with urea without any substantial racemization at the same time. This is remarkable, especially since the method is a fusion process carried out at higher temperatures than are employed in the known aqueous process.

The process is illustrated by the following example relating to a new and therapeutically valuable optically active compound d(+) 5-methyl-5-phenyl hydantoin.

EXAMPLE (a) *Preparation of alpha-amino-alpha-phenyl propionic acid*

One pound of d,l-5-methyl-5-phenylhydantoin is dissolved in 3 quarts of water containing 0.8 lb. of sodium hydroxide. The resulting solution is heated at its boiling point for 5 days. It is then diluted with an equal volume of cold water and then neutralized with concentrated hydrochloric acid. After standing overnight the mixture is filtered, the filtrate evaporated under reduced pressure to ⅓ to ½ of its volume, cooled and filtered again. The combined solids from these two filtrations are mixed with 2 quarts of water plus 1 quart of ethyl alcohol and boiled for about one hour. The mixture is cooled and filtered. The solid when dried in an oven represents about 80% of the product. It will contain some sodium chloride but is suitable for formylation. However, the filtrates from which it was separated can be combined and evaporated to dryness under reduced pressure. The residue from this evaporation is boiled with 1 quart of water plus 1 pint of alcohol for 1 hour, cooled and filtered. After drying, this solid product is combined with the above mentioned product containing some sodium chloride to give a total of 95 to 100% of the theoretical yield of d,l-α-amino-α-phenyl propionic acid of formula,

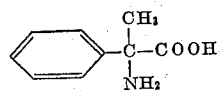

(b) *Formylation of α-amino-α-phenyl propionic acid*

1 lb. of the above described d,l-α-amino-α-phenyl propionic acid is dissolved in 1.3 gallons of commercial (90%) formic acid in a container fitted with a condenser, stirrer and a dropping funnel. The solution is heated to 60° C. at which point the heat source is removed and 0.6 gallon of acetic anhydride is added at such a rate as to keep the temperature at 60 to 65° C. When addition of acetic anhydride is complete, stirring is continued until the temperature drops to about 40° C. The solvent is then completely removed under reduced pressure. The residue is a white solid which is quite soluble in alcohol. It is dissolved in 0.4 gallon of hot alcohol (Formula 3A—

U. S. Government). The solution is then mixed with a moderate amount of decolorizing charcoal (e. g. "Darco") and then filtered. A small amount of alcohol is used to wash the charcoal. The hot alcoholic filtrate is mixed with 1.2 gallons of hot water. Upon cooling the mixture, the d,l-α-formylamino-α-phenyl propionic acid precipitates in crystalline form. The mixture is left in the ice box for 2 days and then filtered and dried. A yield of about 90% of d,l-α-formylamino-α-phenylpropionic acid of melting point 178–179° C. is thereby obtained. It has the formula,

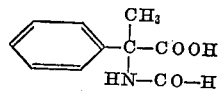

(c) *Resolution of d,l-α-formylamino-α-phenyl propionic acid*

1 lb. of the d,l-α-formylamino-α-phenylpropionic acid, prepared for example as described above, and 2.05 lbs. of anhydrous brucine are dissolved in 1.2 gallons of hot butanol. The hot solution is treated with charcoal and filtered. Enough hot water is added to the hot filtrate to bring the solvent to 90% concentration of butanol. The hot solution is allowed to cool slowly to 25° C. It is then left in an ice box for several days. The solid product is filtered off, the butanol being removed from it as thoroughly as possible by suction. It is the brucine salt of d(+)-α-amino-α-phenylpropionic acid. The filtrates contain the l(−) salt and can be evaporated and further processed or recrystallized as given below for the d(+) salt in order to obtain the pure dry l(−) salt.

The solid brucine salt of the d(+) compound is recrystallized by dissolving it in 0.3 gallon of hot butanol and adding enough hot water to make the concentration 90% butanol. The solution is allowed to cool to 25° C. and is then placed in an ice box for several days. The solid is filtered off and the procedure is repeated once more. The final product has $[\alpha]^{D_{27}}=+16°$ (+15.5° to 16.7°) and melts at about 100 to 106° C. after drying in vacuo. The yield is 85%. It is a compound which may be represented as follows:

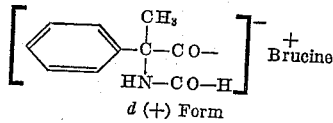

*d (+) Form*

In order to obtain the free d(+) acid, 1 lb. of the brucine salt is mixed with ⅓ gallon of chloroform. 1 quart of water containing 0.2 quart of concentrated ammonium hydroxide is added and the mixture shaken vigorously for ½ hour. The water layer is removed and the chloroform is extracted as above with ½ quart of dilute ammonium hydroxide. The brucine is recovered by distilling off the chloroform.

The dilute ammonium hydroxide extracts are combined, mixed with charcoal and filtered. The filtrate is evaporated to dryness in vacuo. The residue is dissolved in 1 qt. of water and ⅐ qt. of concentrated hydrochloric acid is added. A white solid precipitates. The mixture is refluxed for an hour. The resulting solution is evaporated to dryness in vacuo. The residue is dissolved in ⅓ qt. of hot water and the resulting solution is made very slightly basic with concentrated ammonium hydroxide. A white solid precipitates and the mixture is refluxed for ½ hour followed by cooling in an ice bath. The mixture is filtered, and the solid product is washed with ice water and dried at 60° C. It is pure d(+) α-amino-α-phenyl-propionic acid and has a melting point of 285° C. It also has $[\alpha]^{D_{20}}=+68°$ to 70°.

(d) *Fusion process for conversion of d(+)-α-amino-α-phenylpropionic acid to d(+) 5-methyl-5-phenyl-hydantoin*

The d(+) acid obtained under (c) has the formula,

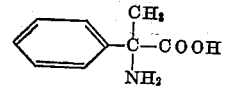

1 lb. of this d(+) compound is mixed thoroughly with 10 lbs. of powdered urea. The mixture is carefully heated to 145° C. When a clear solution is obtained, heating is continued at 145° C. for 45 minutes. The hot liquid is poured into 1 3/10 gals. of water and is followed by 1 gal. of conc. hydrochloric acid. The mixture is heated almost to reflux for ½ hour, cooled and filtered. The solid product is washed with cold water and then dried. The yield is 1 lb. M. P. = 244° C. $[\alpha]^{D_{25}}=+109°$. This final product is d(+) 5-methyl-5-phenylhydantoin and has the formula,

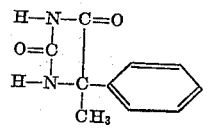

50 g. of d(+) 5-methyl-5-phenylhydantoin is dissolved in 500 cc. of water containing one equivalent of sodium hydroxide and the resulting solution evaporated to dryness under reduced pressure. The white, slightly hygroscopic, powdery residue consists of the sodium salt of d(+) 5-methyl-5-phenylhydantoin.

50 g. of d(+) 5-methyl-5-phenylhydantoin is dissolved in 500 cc. of water containing one equivalent of potassium hydroxide and the resulting solution frozen in the form of a shell on the internal surface of a large balloon flask. The flask is connected to a high vacuum unit and the ice sublimed from the frozen mass. The residue which is white, fluffy, slightly hygroscopic powder consists of the potassium salt of d(+) 5-methyl-5-phenylhydantoin.

If desired, d(+) α-amino-α-phenylbutyric and d(+) α-amino-α-phenylvaleric acids may be substituted for the propionic acid derivative used in the above fusion step. In such a case one obtains d(+) 5-ethyl-5-phenylhydantoin and d(+) 5-n-propyl-5-phenylhydantoin respectively.

The yield in the above described reaction of d(+)-α-amino-α-phenylpropionic acid with urea is more than 90% and is obtained by a reaction lasting only 45 minutes, whereas when the same reactants are heated together in aqueous solution it requires up to about 15 hours to obtain a 35 to 40% yield of desired product.

It is well known among clinicians that 5-phenyl-5-alkyl-substituted hydantoins cause a severe rash which is such a common occurrence that it is known as "Nirvanol sickness," Nirvanol being 5-phenyl-5-ethyl hydantoin. Contrasted therewith, I have now found that the d(+) hydantoin of the above example does not cause a rash when administered to humans and yet retains a high degree of anticonvulsant activity with negligible hypnotic activity. Thus, the new product of the above example provides a highly valuable anticonvulsant of unexpected efficacy.

The hydantoin of the above example can be administered to humans to combat epileptic seizures in oral dosages (e. g. in capsule or tablet form) of about 0.2 gram two or three times per day. Instead of the hydantoin, its sodium or potassium salt may also be used.

The new urea fusion process of this invention is applicable to the preparation of the d, l as well as to the d and l isomeric 5-phenyl-5-lower alkyl hydantoins. α - Amino-α-lower alkyl-α-phenylacetic acids having a branched carbon chain in the alkyl group can also be used in the process to produce products which contain a branched chain alkyl group in the 5-position.

The reaction conditions and quantities of the reactants used in the process can be varied within rather wide ranges. Best results are obtained when an excess, preferably five to ten mols, of urea is employed. The fusion temperature can be varied from about 135 to 190° C. Temperatures over about 190° C. result in considerable decomposition and polymerization of the urea while temperature below about 135° C. fail to give a satisfactory fused liquid phase. Optimal results are obtained when the fusion is carried out between about 140 and 150° C.

What I claim is:

1. Process for obtaining a 5-phenyl-5-lower alkyl hydantoin which comprises reacting a dry α-amino-α-phenyl-α-lower alkyl acetic acid with dry fused urea at a temperature at which a mixture of dry urea and said dry acetic acid form a homogeneous liquid phase.

2. Process for obtaining a 5-phenyl-5-lower alkyl hydantoin which comprises reacting an α-alkyl hydantoin which comprises reacting an α-amino-α-phenyl-α-lower alkyl acetic acid with urea under substantially anhydrous conditions at a temperature between about 135 and 190° C.

3. Process for obtaining a 5-phenyl-5-lower alkyl hydantoin which comprises reacting an α-amino-α-phenyl-α-lower alkyl acetic acid with an excess of urea under substantially anhydrous conditions at a temperature between about 140 and 150° C.

4. Process for obtaining a d(+)5-phenyl-5-lower alkyl hydantoin which comprises reacting a d(+)α-amino-α-phenyl-α-lower alkyl acetic acid with urea under substantially anhydrous conditions at a temperature between about 135 and 190° C.

5. Process for obtaining a d(+)5-phenyl-5-lower alkyl hydantoin which comprises reacting a d(+)α-amino-α-phenyl-α-lower alkyl acetic acid with an excess of urea under substantially anhydrous conditions at a temperature between 140 and 150° C.

6. Process for obtaining d(+)5-phenyl-5-methyl hydantoin which comprises reacting d(+)α-amino-α-phenylpropionic acid with urea under substantially anhydrous conditions at a temperature between about 135 and 190° C.

7. Process for obtaining d(+)5-phenyl-5-methyl hydantoin which comprises reacting d(+)α-amino-α-phenylpropionic acid with an excess of urea under substantially anhydrous conditions at a temperature between about 140 and 150° C.

8. Process for obtaining a therapeutic preparation having high anticonvulsant activity, negligible hypnotic activity, and low toxicity which comprises fusing a substantially anhydrous mixture of d(+)α-amino-α-phenyl propionic acid and urea at a temperature above 140° C. for a time on the order of one hour, adding acidified water, cooling and separating the solid from the solution, said solid consisting essentially of d(+)5-methyl-5-phenyl hydantoin having high anticonvulsant activity, negligible hypnotic activity, and low toxicity.

LOREN M. LONG.

REFERENCES CITED

The following references are of record in the file of this patent:

UNITED STATES PATENTS

| Number | Name | Date |
| --- | --- | --- |
| 1,861,458 | Sobotka | June 7, 1932 |

OTHER REFERENCES

Chemical Abstracts, vol. 29, p. 126⁹ citing Slotta et al., Berichte 67B, 1529–1534 (1934).